United States Patent [19]

Rockafellow

[11] Patent Number: 4,469,115

[45] Date of Patent: Sep. 4, 1984

[54] EXTENDED VALVE BOX AND PROCESS FOR SECURING EXTENSION TO VALVE BOX

[75] Inventor: Gary B. Rockafellow, West Chester, Pa.

[73] Assignee: Bonded Products, Inc., West Chester, Pa.

[21] Appl. No.: 465,728

[22] Filed: Feb. 11, 1983

[51] Int. Cl.³ .............................................. F16L 5/00
[52] U.S. Cl. .................................... 137/15; 137/370; 156/71; 156/293; 404/26
[58] Field of Search ............... 137/364, 365, 368, 369, 137/370, 15; 156/71, 293, 294; 404/26

[56] References Cited

U.S. PATENT DOCUMENTS

| 380,308 | 4/1888 | Barry, Jr. | 137/370 |
| 2,176,399 | 10/1939 | Garrett | 137/368 |
| 3,455,077 | 7/1969 | Long | 156/71 |
| 3,672,383 | 6/1972 | Trimble et al. | 137/15 |
| 4,188,151 | 2/1980 | Hall | 404/26 |

Primary Examiner—Martin P. Schwadron
Assistant Examiner—Sheri Novack
Attorney, Agent, or Firm—Howson and Howson

[57] ABSTRACT

An extension is secured to a valve box in a roadway to be repaved by coating the valve box shoulder and the bottom of the extension with a thin layer of epoxy adhesive, placing a heated neoprene gasket on the shoulder, and setting the extension in place on the gasket. Heating makes the gasket pliable, and heat from the gasket assists in curing the adhesive. A curing-type liquid sealant is introduced into the space around the periphery of the extension to prevent the entry of water, salt and other corrodents.

12 Claims, 3 Drawing Figures

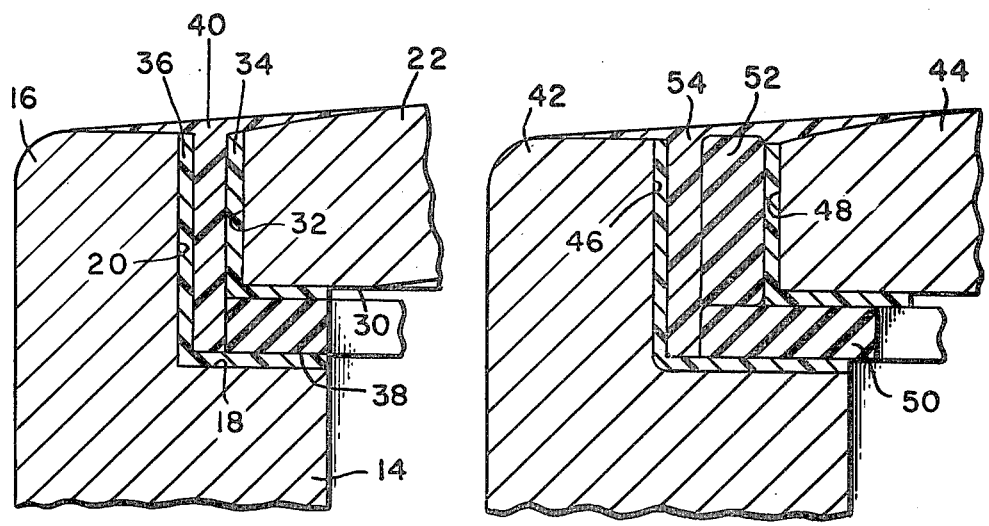
FIG. 2.
FIG. 3.
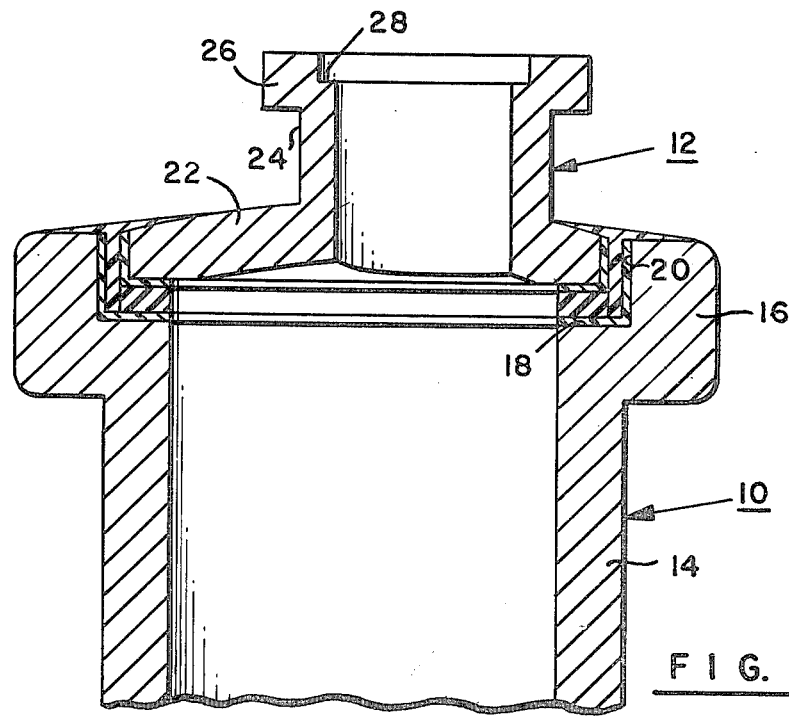
FIG. 1.

EXTENDED VALVE BOX AND PROCESS FOR SECURING EXTENSION TO VALVE BOX

BRIEF SUMMARY OF THE INVENTION

This invention relates to a process for securing an extension to a valve box in a roadway to be repaved and to the extended valve box structure resulting from that process. The invention has utility in roadway repaving, and particularly in providing for secure attachment of a valve box extension to a valve box such that the attachment is resistant to hostile environmental conditions.

Utilities, including water, gas, electric and telephone companies and sewer authorities, typically install pipes and cables underneath the roadways of the municipalities which they serve. To provide access to these pipes and cables, the utilities install, at various locations underneath the roadways, enclosures known as "valve boxes". The valve boxes are usually constructed of masonry, metal, plastic, or combinations of these materials. The upper portions of valve boxes are typically in the form of upright circular cast metal cylinders having diameters usually in the range from about 6 to 24 inches. Occasionally, valve boxes are found having diameters outside this range. Each valve box is provided with a metal ring at its upper end which accomodates a valve box cover. The valve box cover is usually a heavy metal plate. The larger valve box covers are sometimes known as "manhole covers". The valve box is desirably installed so that its ring and the valve box cover are flush with the roadway surface.

When the roadway is repaved, the utilities are normally responsible for raising their valve boxes to match the new higher level of the roadway surface which will result from repaving. Usually this responsibility is met by the use of valve box extensions, commonly known as "extension rings".

A typical valve box extension is a metal casting designed to fit into the valve box ring which originally accommodated the valve box cover. The height of the valve box extension varies depending on the type of repaving which is to take place.

A typical valve box extension consists of a large diameter ring corresponding to the cover-retaining ring of the valve box to which the extension is to be attached, and a smaller-diameter ring extending downwardly from the large-diameter ring. The smaller-diameter ring has an outer diameter equivalent to that of the valve box cover, and it fits into the space within the valve box ring originally occupied by the cover. While the typical extension is as just described, the term "extension", as used herein, should be understood as including various special forms of extensions, including "reducers" in which the access opening through the extension is smaller than the original access opening of the valve box.

As soon as a valve box extension is installed, it is immediately susceptible to destructive environmental conditions that can cause it to become separated from its valve box. These destructive environmental conditions include road vibration caused by passing vehicles, deleterious effects of expansion and contraction resulting from freezing and thawing of water, corrosive effects of road salts and other substances, constant exposure to road surface temperature fluctuations, and thermal expansion and contraction of the roadway.

Frequently, these environmental conditions combine to loosen the extensions in their valve boxes. When the extensions are loosened, they can be forced upward by passing vehicles. A common result of contact between a valve box extension and a passing vehicle is significant damage to the undercarriage of the vehicle. Liability for such damage has proven to be a serious and costly problem.

Accordingly, the need has long existed for a dependable bond between valve boxes and their extensions. While various approaches toward solving problems of vibration, expansion and contraction, corrosion and temperature fluctuation are known, there has nevertheless been no successful solution, prior to this invention, to the problems resulting from loosened valve box extensions.

The principal object of this invention is to provide a secure and durable bond between a valve box and its extension which resists loosening due to vibration, freezing and thawing of water, corrosion, temperature fluctuations, and thermal expansion and contraction.

The extended valve box in accordance with the invention comprises a valve box having a cover-retaining shoulder and a cover-retaining ring, and an extension vertically supported by the shoulder and held against horizontal translation by the cover-retaining ring. It is characterized by a layer of adhesive on the shoulder, a layer of adhesive on the surface of the extension facing the shoulder, a flexible gasket bonded to both adhesive layers and located between the extension and the shoulder, and a flexible seal located between the cover-retaining ring and the periphery of the extension to prevent the entry of moisture and corrodents into the spaces between the extension and the cover-retaining ring and shoulder of the valve box.

In the process of securing the extension to the valve box, the opposing surfaces of the valve box and extension are cleaned, and a thin layer of adhesive is applied to the cleaned surfaces. A flexible gasket is set in place on the should of the valve box, and the extension is placed on top of the gasket so that the valve box is adhered to one side of the gasket, and the extension is adhered to the other side of the gasket. A sealant is introduced between the periphery of the extension and the cover-retaining ring to prevent the entry of water and corrodents. Preferably, the gasket is a synthetic rubber gasket which is formulated to have a Shore "A" durometer reading within the range of approximately 85-100 under average ambient temperatures. Before installation, the gasket material is heated. Heating makes the gasket material pliable, so that it is easier to set in place. The Shore "A" durometer reading of the gasket when heating should be around 15. When the temperature returns to normal, the gasket material resumes its original hardness so that it can withstand traffic on the roadway without excessive deformation. Significantly, the heating step also assists in curing the adhesive material, making it possible to apply the adhesive material in thin layers, which, while slower in curing, produce a much more effective bond than thick layers.

Further objects, advantages and details of the invention will be apparent from the following detailed description when read in conjunction with the drawings.

BRIEF DESCRIPTION OF THE DRAWINGS

FIG. 1 is a vertical section through the upper portion of a valve box, showing a reducer-type extension bonded in place in accordance with the invention;

FIG. 2 is a fragmentary section showing details of the bond in FIG. 1; and

FIG. 3 is a vertical section showing the details of an alternative form of bond in accordance with the invention, wherein an additional gasket is provided in the vertical space between the original cover-retaining ring of the valve box and the periphery of the extension.

DETAILED DESCRIPTION

FIG. 1 shows the upper portion of a typical metal valve box 10 which is extended in accordance with the invention by a reducer-type extension 12. The valve box comprises a circular cylindrical wall 14 having a cover-retaining ring 16 at its upper end. The configuration at the upper end of wall 14 provides a shoulder 18, which initially serves as a cover-retaining shoulder, and an inwardly facing cylindrical surface 20 on ring 16, which initially serves as a cover-retaining surface.

The extension comprises a convex plate 22 having a neck 24. At the upper end of the neck, there is provided a cover-retaining ring 26 and a cover-retaining shoulder 28 similar respectively to ring 16 and shoulder 18, although smaller in size.

As shown in FIG. 2, an annular area 30 on the underside of cover plate 22 extends inwardly from the periphery of the cover plate to a location inward with respect to the inner face of valve box wall 14. Surface 30 faces shoulder 18 of the valve box. Vertical cylindrical surface 32 of extension 22 faces the inwardly facing cylindrical surface 20 of cover-retaining ring 16.

Surfaces 30 and 32 of the extension are coated with a thin layer 34 of adhesive material. The adhesive layer extends inwardly on surface 30 at least to a location directly above the inner surface of valve box wall 14. Surface 20 and shoulder 18 of the valve box are similarly coated with a thin adhesive layer 36. (The thicknesses of these adhesive layers is exaggerated in the drawings.)

A flexible gasket 38 overlies shoulder 18, and extends along substantially the entire valve box shoulder. This gasket is bonded to the horizontal portion of adhesive layer 36, and to the horizontal portion of adhesive layer 34. A flexible sealant 40 fills the space between the vertical portions of adhesive layers 34 and 36 and between gasket 38 and the vertical portion of adhesive layer 36. Where a larger space exists between the cover-retaining ring and the extension, an additional gasket is used as illustrated in FIG. 3. In that figure, extension 44 is secured within cover-retaining ring 42 of a valve box. Surface 46 of ring 42 and surface 48 of extension 44 are spaced from each other by a considerable distance. Adhesive layers are provided as in FIG. 2, and a flexible gasket 50 is bonded to the horizontal portions of the adhesive layers. An additional gasket 52 fills up part of the space between surfaces 46 and 48, and extends around substantially the entire periphery of the extension. The remainder of the space is filled by a sealant 54. The material of gasket 52 is similar to the material of gasket 50.

The method of installation of an extension in a valve box in accordance with the invention is as follows. First, any necessary excavation around the valve box is made. The gasket or gaskets, which are initially in the form of elongated strips are placed in a heater box, and heated to a temperature sufficient to soften the gasket material in order to allow it to be set in place easily. A typical Neoprene gasket strip can be heated up to 250° F. for up to two hours. However, such extensive heating is normally unnecessary. Where the adhesive is a two-part epoxy adhesive consisting of a resin and a curing agent, the curing agent may be heated in the heater box at the same time. However, precautions should be taken to insure that the curing agent temperature does not exceed approximately 110° F.

The shoulder of the valve box and the inwardly facing surface of the cover-retaining ring of the valve box should be thoroughly cleaned. Cleaning may be accomplished by sandblasting, by the use of a wire brush, or by any other suitable process. The outwardly facing peripheral surface of the extension and the annular surface thereof corresponding to surface 30 (FIG. 2) are similarly cleaned.

If a two-part adhesive is to be used, the components of the adhesive are thoroughly mixed, and then applied to the cleaned surfaces of the valve box and extension by means of a brush. The adhesive should be applied in a very thin layer. A very thin layer of adhesive is desirable, because it provides a more effective bond than a thick layer.

The heated gasket is then set in place on the shoulder of the valve box as shown in FIG. 2. Following this, the extension is placed over the gasket, as shown in FIG. 2. If adequate space exists between the retaining ring and the periphery of the extension, an additional gasket corresponding to gasket 52 (FIG. 3) is set in place about the periphery of the extension, as shown in FIG. 3. Finally, a curing type liquid sealer is introduced into the remaining space between the cover-retaining ring and the extension. The assembly is then allowed to cure for approximately 4–8 hours before it is exposed to traffic.

The gasket on which the extension rests (i.e. gasket 38 in FIG. 2 or gasket 50 in FIG. 3) is relatively hard before it is placed in the heater box. It typically has a durometer reading on the Shore A scale of approximately 85–100. Although it softens when heated, it returns to its original hardness in the final assembly, and is thus able to withstand traffic without excessive deformation. Heating of the gasket material makes it pliable and easy to set in place.

Heating of the gasket material also aids in curing of the adhesive layers. As pointed out above, it is desirable to make the adhesive layers as thin as possible for optimum bonding. A thick layer of adhesive, however, has the disadvantage that is does not cure as rapidly as a thick layer. The heating of the gasket overcomes this disadvantage by speeding the curing of the adhesive layers in contact with the gasket.

The method of securing an extension ring just described provides a very strong and durable bond which will not be loosened by traffic and environmental conditions normally encountered in roadways. The gasket on which the extension rests effectively absorbs vibration caused by traffic on the roadway, and reduces the likelihood of failure due to metal fatigue either in the cover or in the valve box. The sealant (40 in FIG. 2 and 54 in FIG. 3) effectively prevents water, road salt and other corrosive materials from entering into the space between the extension and the cover retaining ring and causing loosening of the ring by chemical action. The seal is desirably a resilient material which will accommodate differential expansion of the extension and the cover-retaining ring without forming gaps for the entry of water and corrodents. In FIG. 3, gasket 52 assists in accommodating differential expansion.

The gaskets are preferably flexible strips typically ¼ inch thick, one or two inches wide, and initially three feet long. They may be cut to the desired length immediately prior to installation. The gasket material is preferably chloroprene (neoprene), but may consist of any of a number of natural or synthetic polymers, including, but not limited to, natural rubber, isoprene, butadiene, nitrile-butadiene, styrene-butadiene, ethylene-propylene copolymers, ethylene-propylene-diene terpolymers, polyacrylates, chlorinated polyethylene, chlorosulfonated polyethylene, polyesters, polyethers, polyurethane rubbers, silicone polymers, and epichlorhydrins, all with appropriate coupling agents.

The bonding adhesive is preferably a two-part heat-curable epoxy adhesive with an appropriate coupling agent. A suitable epoxy adhesive is a proprietary adhesive known as "PL Adhesive", available from Bonded Products, Inc., 439 South Bolmar Street, West Chester, Pa. 19380. However, any one of a variety of available epoxy adhesives can be used, as well as other natural or synthetic adhesive compositions, including, but not limited to, polyurethane adhesives and silicone polymer adhesives. These materials should, of course, be chosen for compatibility with the gasket material, and also for an ability to adhere to cast iron or to whatever materials the valve box and extension are made of. Desirably, a heat-curable adhesive is chosen in order to take advantage of the heat available in the heated gasket to effect curing and to produce a secure and durable bond between the rubber and metal parts of the assembly.

The material used to form seal 40 in FIG. 2 and seal 54 in FIG. 3 is preferably a curing type liquid sealing material. A preferred composition is a proprietary sealant known as "Bonded Products Extension Ring Sealer and Filler" available from Bonded Products, Inc. Other suitable curing type liquid sealants include polyurethane sealants, silicone polymer sealants, and epichlorhydrin sealants, all with appropriate coupling agents. Various other natural or synthetic polymers can of course be used.

The process of the invention is suitable for securing various forms of valve box extensions into place, and may be modified in various respects. For example, in FIG. 2, it is desirable, but not necessary to apply adhesive to vertical surfaces 20 and 32. The adhesive on these surfaces helps to provide a suitable bonding surface for the sealant, but more sealants will adhere directly to the metal surfaces if they are clean. Other modifications may of course be made without departing from the scope of the invention as defined in the following claims.

I claim:

1. An extended valve box resistant to traffic, corrosion moisture and temperature fluctuations comprising a valve box having a cover-retaining shoulder and a cover-retaining ring, and an extension vertically supported by said shoulder and held against horizontal translation by said cover-retaining ring, characterized by a layer of adhesive on said shoulder, a layer of adhesive on the area of the extension facing the shoulder, a flexible gasket bonded to both adhesive layers and located between the extension and the shoulder, and flexible sealant means located between the cover-retaining ring and the periphery of the extension to prevent the entry of moisture and corrodents into the spaces between the extension and the cover-retaining ring and shoulder of the valve box.

2. An extended valve box according to claim 1 in which the flexible gasket is a chloroprene gasket.

3. An extended valve box according to claim 1 in which the adhesive layers are layers of epoxy adhesive.

4. An extended valve box according to claim 1 in which the flexible gasket is a chloroprene gasket and in which the adhesive layers are layers of epoxy adhesive.

5. An extended valve box according to claim 1 including a second flexible gasket located between the periphery of the extension and the cover-retaining ring and extending around substantially the entire periphery of the extension.

6. A process for securing an extension to a valve box in a roadway to be repaved comprising the steps of:
cleaning the cover-retaining shoulder of a valve box;
cleaning the bottom surface of an extension compatible with the valve box at least over substantially all of the area thereof which overlies the cover-retaining shoulder of the valve box when the extension ring is in place thereon;
applying a layer of adhesive to said shoulder and to said cleaned area of the bottom surface of the extension;
placing a flexible gasket material on said shoulder and securing the gasket material to the shoulder by said layer of adhesive on the shoulder;
placing the extension on the gasket material and securing the extension to the gasket material by said layer of adhesive on said cleaned area of the bottom surface of the extension; and
filling the space between the periphery of the extension ring and the cover-retaining ring with a curable liquid sealing agent.

7. A process according to claim 6 in which the flexible gasket is a chloroprene gasket.

8. A process according to claim 6 in which the adhesive is an epoxy adhesive.

9. A process according to claim 6 in which the flexible gasket is a chloroprene gasket and the adhesive is an epoxy adhesive.

10. A process according to claim 6 including the step of placing a second flexible gasket between the periphery of the extension and the cover-retaining ring of the valve box.

11. A process according to claim 6 including the steps of cleaning the inwardly facing surface of the cover-retaining ring of the valve box, cleaning the periphery of the extension at least over substantially all of the area thereof which lies opposite to the cover-retaining ring when the extension ring is in place therein, and, before placing the flexible gasket material on said shoulder, applying layers of adhesive to said inwardly facing surface of the cover-retaining ring and to said area of the periphery of the extension.

12. The process of claim 6 in which the adhesive layers on said shoulder and on said cleaned area of the bottom surface of the extension ring are thin layers of a heat-curable adhesive, and including the step of heating the flexible gasket material to a temperature sufficient to effect a substantial increase in the pliability thereof before placing it on said shoulder, whereby the gasket material is more easily set in place, and heat from the gasket material assists in curing the adhesive layers.

* * * * *